(12) United States Patent
Schwegler et al.

(10) Patent No.: US 11,746,902 B2
(45) Date of Patent: Sep. 5, 2023

(54) DEVICE FOR ACTUATING A PARKING LOCK MEANS OF AN AUTOMATIC TRANSMISSION AND METHOD FOR OPERATING SUCH A DEVICE

(71) Applicant: ZF Friedrichshafen AG, Friedrichshafen (DE)

(72) Inventors: Thomas Schwegler, Tettnang (DE); Sven Jabs, Langenargen (DE); Andreas Bisping, Friedrichshafen (DE); Florian Weinl, Bodolz (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 128 days.

(21) Appl. No.: 17/604,232

(22) PCT Filed: Mar. 20, 2020

(86) PCT No.: PCT/EP2020/057845
§ 371 (c)(1),
(2) Date: Oct. 15, 2021

(87) PCT Pub. No.: WO2020/212076
PCT Pub. Date: Oct. 22, 2020

(65) Prior Publication Data
US 2022/0205535 A1      Jun. 30, 2022

(30) Foreign Application Priority Data

Apr. 17, 2019   (DE) .................... 10 2019 205 596.6

(51) Int. Cl.
*F16H 63/34* (2006.01)
*F16H 61/12* (2010.01)
(Continued)

(52) U.S. Cl.
CPC .......... *F16H 63/3483* (2013.01); *B60T 1/005* (2013.01); *F16H 61/12* (2013.01);
(Continued)

(58) Field of Classification Search
CPC ............. F16H 63/3416; F16H 63/3425; F16H 63/3433; F16H 63/3483; F16H 63/48; B60T 1/005; B60T 1/062
See application file for complete search history.

(56) References Cited

U.S. PATENT DOCUMENTS 6,823,976 B2 * 11/2004 Schmid ............... F16H 63/3475
192/219.5
8,844,703 B2    9/2014 Jang et al.
(Continued)

FOREIGN PATENT DOCUMENTS

| CN | 102887140 A | 1/2013 |
| CN | 107850212 A | 3/2018 |

(Continued)

OTHER PUBLICATIONS

International Search Report (English Translation) PCT/EP2020/057845, dated May 29, 2020. (2 pages).
(Continued)

*Primary Examiner* — Richard M Lorence
(74) *Attorney, Agent, or Firm* — Dority & Manning, P.A.

(57) ABSTRACT

A device (1) for actuating a parking lock device (2) of an automatic transmission includes a piston (3) guided in a cylinder (5) and hydraulically displaceable counter to a spring force of an actuation spring (4). The piston (3) is form-lockingly fixable in a first position and in a second position by radially displaceable blocking elements (26) of a blocking device (15). The blocking elements (26) are radially displaceable by an actuation element (17). The radial displacement path of the blocking elements (26) and
(Continued)

an operating condition of the actuation element (17) corresponding thereto in the first position of the piston (3) deviate from the radial displacement path of the blocking elements (26) and the operating condition of the actuation element (17) corresponding thereto in the second position of the piston (3).

20 Claims, 5 Drawing Sheets

(51) Int. Cl.
     *F16H 63/48*      (2006.01)
     *B60T 1/00*      (2006.01)

(52) U.S. Cl.
     CPC ......... *F16H 63/3433* (2013.01); *F16H 63/48* (2013.01); *F16H 2061/1224* (2013.01); *F16H 2061/1288* (2013.01)

(56) References Cited

U.S. PATENT DOCUMENTS

| | | | |
|---|---|---|---|
| 10,436,321 B2 | 10/2019 | Spratte et al. | |
| 10,995,856 B2 | 5/2021 | Gausrab et al. | |
| 2015/0159752 A1 | 6/2015 | Popp et al. | |
| 2015/0167843 A1 | 6/2015 | Schuller et al. | |
| 2022/0128146 A1* | 4/2022 | Schulz | F16H 63/38 |

FOREIGN PATENT DOCUMENTS

| | | |
|---|---|---|
| CN | 108458107 A | 8/2018 |
| DE | 102012210571 A1 | 12/2013 |
| DE | 102012013373 A1 | 1/2014 |
| DE | 102013214188 A1 | 1/2015 |
| DE | 102015002428 A1 | 8/2015 |
| DE | 102016221477 A1 | 5/2018 |
| JP | H08222432 A | 8/1996 |
| JP | 2017101754 A | 6/2017 |
| KR | 100989042 B1 | 10/2010 |
| WO | WO 2018/082949 A1 | 5/2018 |

OTHER PUBLICATIONS

German Search Report DE 10 2019 205 596.6, dated Feb. 3, 2020. (12 pages).
International Preliminary Exam Report PCT/EP2020/057845, dated Oct. 1, 2020. (16 pages).
Chinese Office Action (English Translation) 202080029503.5, dated Jun. 6, 2022. (10 pages).

* cited by examiner

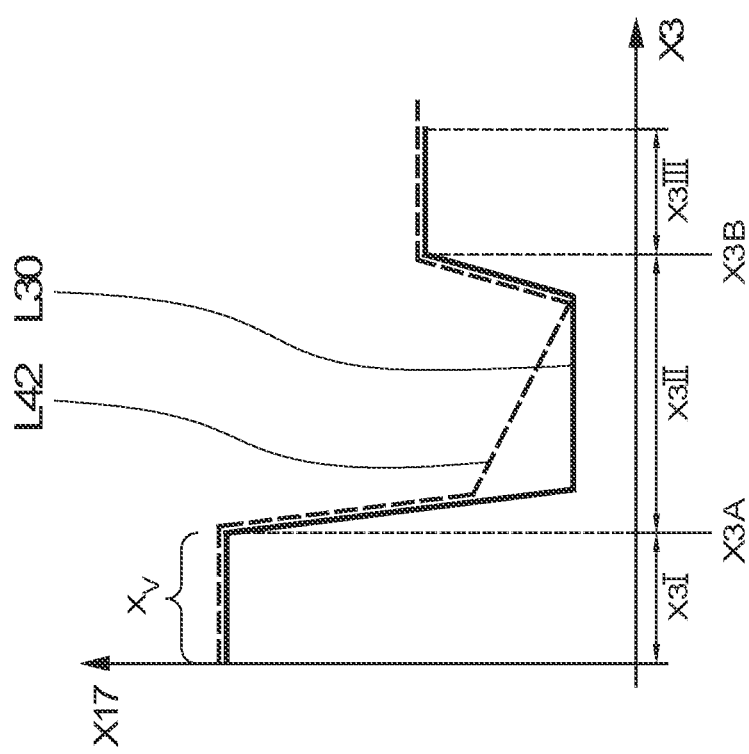

DEVICE FOR ACTUATING A PARKING LOCK MEANS OF AN AUTOMATIC TRANSMISSION AND METHOD FOR OPERATING SUCH A DEVICE

CROSS-REFERENCE TO RELATED APPLICATIONS

The present application is related and has right of priority to German Patent Application No. 102019205596.6 filed in the German Patent Office on Apr. 17, 2019 and is a nationalization of PCT/EP2020/057845 filed in the European Patent Office on Mar. 20, 2020, both of which are incorporated by reference in their entirety for all purposes.

FIELD OF THE INVENTION

The invention relates generally to a device for actuating a parking lock device of an automatic transmission. The invention also relates to a method for operating the parking lock device.

BACKGROUND

DE 10 2012 013 373 A1 describes an actuator for a parking lock actuation, in particular for automatic transmissions in motor vehicles. The actuator includes a piston guided in a cylinder, which actuates, by an actuating rod, a locking pawl for a parking interlock gear in the transmission. The piston is hydraulically operable and disengages the parking lock counter to the force of an integrated preloading spring. In the non-pressurized condition of the piston, the preloading spring engages the parking lock. Additionally, an electromagnetically actuatable blocking device is provided, which is capable of fixing the piston in the disengaged position in a form-locking manner. The blocking device fixes the piston, by radially extendable blocking elements, in relation to a guide sleeve secured at the cylinder. The piston is also form-lockingly fixable by the blocking device in the position corresponding to the engaged condition of the parking lock.

Parking lock systems are utilized in automatic transmissions of motor vehicles for fixing and releasing the drive train. For reasons of comfort and also for safety-relevant reasons, a driver is to be informed of the condition of the parking lock system. PNP sensors are often utilized for this purpose. However, sensor thresholds, which are necessary for sensing the condition of a parking lock system by a PNP sensor, may not be able to be unambiguously associated with the condition of the parking lock.

In a mode of operation of a parking lock system as specified, a parking lock piston assumes the particular intended end position in the engaged condition as well as in the disengaged condition of a parking lock. In these end positions of a parking lock piston, the condition of the parking lock can be unambiguously inferred from the PNP signal. In the event of a fault, however, it is conceivable that the parking lock piston does not reach the intended end positions. It is possible that a parking lock piston remains in a position that is spaced apart from the end positions due to chips or due to elevated friction. Unfavorable operating conditions of a parking lock system can result in a PNP sensor identifying the attainment of an end position of the parking lock piston, but a coverage of a locking cone does not necessarily coincide with the engaged condition or with the disengaged condition of a parking lock.

This problem could be solved by the use of a limit switch. However, the installation space necessary for the utilization of a limit switch of this type is often not available.

SUMMARY OF THE INVENTION

Example aspects of the present invention provide an improvement over the prior art.

Accordingly, a device is provided for actuating a parking lock device of an automatic transmission. The device includes a piston, which is guided in a cylinder and is hydraulically displaceable counter to the spring force of an actuation spring acting upon a parking pawl of the parking lock device. The piston is bringable into an operative connection with the parking pawl. In addition, the piston is form-lockingly fixable in a first position and in a second position by radially displaceable blocking elements of a blocking device. The first position corresponds to an engaged operating condition of the parking lock device, while the second position of the piston corresponds to a disengaged operating condition of the parking lock device. The blocking elements are radially displaceable by an actuation element.

The radial displacement path of the blocking elements and an operating condition of the actuation element corresponding thereto in the first position of the piston deviate from the radial displacement path of the blocking elements and the operating condition of the actuation element corresponding thereto in the second position of the piston.

Due to the preferably skillful selection of the interlocking geometry, a possibility for differentiating the interlocking conditions of the device is easily available. This differentiation, in turn, offers the possibility for implementing some functions, such as an adaptation of a sensor. With a sensor of this type, it is detectable, for example, whether the interlock of the piston is effective, i.e., is active, or whether an actuating movement of the piston has been released by the blocking device.

Via an adaptation of this type and/or an appropriate calibration of the sensor, a desirably high accuracy of a sensor of this type is ensurable despite appropriate material and manufacturing tolerances.

The device according to example aspects of the invention provides a structural relationship between the parking lock piston and the locking armature and/or the actuation element, by which operative relationships between the piston and the actuation element can be determined. This is achieved by the defined locking contour of the blocking device, which allows for an unambiguous determination of the operating condition of the parking lock system. On the basis of the defined locking contour, further unambiguous pieces of sensor information regarding the locking system of the parking lock can be determined with little complexity. On the basis of these further pieces of sensor information, it is unambiguously detectable whether the parking lock device is engaged and locked or disengaged and locked or has a released operating condition and the parking lock piston is in a position between the end positions of the parking lock piston.

The actuation element can be designed to be at least approximately rotationally symmetrical. Moreover, the actuation element can have, consecutively in the axial extension direction of the actuation element, one cylindrical section and two sections widening in the shape of a truncated cone starting from the cylindrical section. Moreover, it can be provided that the blocking elements rest against the sections of the actuation element. The blocking elements are then displaceable in the radial direction with respect to the actuation element by moving the actuation element in the axial extension direction. If the opening angle of the truncated cone-shaped section adjacent to the cylindrical section in the axial extension direction of the actuation element is larger than the opening angle of the further truncated cone-shaped section adjacent to the truncated cone-shaped section, the blocking elements are maintainable in the position locking into the piston with only a little holding force. Moreover, the actuation element is then also transferrable with low actuating forces into an operating condition or into an axial actuating position, in which the blocking device is deactivated. In the present case, the deactivated operating condition of the blocking device is understood to be a released operating condition of a piston, in which the piston is designed to be displaceable.

The piston can have, in the area of its radial inner side facing the actuating element, hollow-cylindrical sections extending in the axial direction and situated adjacent to one another. If the inner diameters of the hollow-cylindrical sections additionally deviate from one another, the interlocked positions of the blocking device and of the piston are easily distinguishable from one another.

It can be provided that the inner diameter of the middle hollow-cylindrical section is smaller than the inner diameters of the hollow-cylindrical sections adjacent to the middle hollow-cylindrical section on either side.

Moreover, in the first position of the piston, the blocking elements can form-lockingly project into the first outer hollow-cylindrical section and, in the second position of the piston, form-lockingly project into the second outer hollow-cylindrical section. It is therefore achieved in a structurally simple way that the blocking elements have different radial displacement paths in the first position of the piston and in the second position of the piston.

Additionally, it can also be provided that the blocking elements rest against a truncated cone-shaped section of the piston in the first position of the piston in the axial direction and rest against a truncated cone-shaped section of the piston in the second position of the piston in the axial direction. Each of the truncated cone-shaped sections is provided between the middle hollow-cylindrical section and one of the outer hollow-cylindrical sections. This structural measure offers the possibility for reliably transferring the blocking elements into their locking position and guiding these from the locking position back into their radial position releasing the actuating movement of piston.

The piston can have hollow-cylindrical sections that extend in the axial direction in the area of its radial inner side, which faces the actuation element. The inner diameters of the hollow-cylindrical sections can deviate from one another. Additionally, it is possible that a middle truncated cone-shaped section is provided between the hollow-cylindrical sections, the inner diameter of which is smaller than the inner diameters of the hollow-cylindrical sections, which are adjacent to the middle truncated cone-shaped section on either side. In addition, the blocking elements can form-lockingly project into the first outer hollow-cylindrical section in the first position of the piston and form-lockingly project into the second outer hollow-cylindrical section in the second position of the piston.

Therefore, the two end positions of the piston and positions of the piston between the two end positions are easily sensible as a function of an axial position of the actuation element.

The blocking elements can rest against a particular truncated cone-shaped section of the piston in the axial direction when the blocking elements project into the hollow-cylindrical sections of the piston. The truncated cone-shaped sections of the piston can be provided between the middle truncated cone-shaped section and one of the outer hollow-cylindrical sections on either side. With this structural measure, the blocking elements are reliably transferrable into their locking position and out of the locking position into their radial position, in which they release the actuating movement of the piston.

The diameter of the middle truncated cone-shaped section can constantly increase or constantly decrease between the truncated cone-shaped sections in the axial direction of the piston. The current position of the piston between the end positions of the piston and, preferably, also the direction of the actuating movement of the piston, is then easily sensible.

In one advantageous refinement of the device according to example aspects of the invention, the blocking elements rest against the further truncated cone-shaped section of the actuation element in the first position and in the second position of the piston.

An actuating movement of the piston between the two positions of the piston is reliably released by the blocking device in a structurally easy way for the case in which, when the piston is in a position between the first position and the second position, the blocking elements are arranged radially between the middle hollow-cylindrical section of the piston and the truncated cone-shaped section of the actuation element adjacent to the cylindrical section.

Additionally, a spring device can be provided between the cylinder and the actuation element. It is possible that the spring force of the spring device acts at the actuation element, acting in the direction of a position of the actuation element, in which the blocking elements rest against the further truncated cone-shaped section of the actuation element. As a result, the blocking device automatically transitions into the interlocked position when the piston is in the first position or in the second position. In other words, the blocking device automatically locks the piston, in this embodiment of the device according to example aspects of the invention, when the piston has arrived in the first position or in the second position.

The actuation element can be actuatable counter to the spring device by an electromagnetic actuator. The blocking device is then deactivatable or transferrable into the released operating condition in response to an appropriate demand to engage or to disengage the parking lock device actuatable by the device.

The axial actuating travel of the actuation element effectuated by the spring device can be limited by a cylinder-side stop. As a result, it is ensurable that the device or the actuation element is actuatable by the electromagnetic actuator starting from a predefined operating condition and the device is operable with little open-loop and closed-loop control complexity.

The blocking elements are designed as balls in one installation space-favorable embodiment of the device according to example aspects of the invention. It can be provided that the balls are axially and radially guided in recesses of a guide sleeve operatively connected to the cylinder.

An operating condition of the blocking device is easily determinable when a sensor is provided for determining an axial actuating travel of the actuation element.

It is possible that the sensor is designed as a PNP sensor or as a Hall sensor, by which an actuating movement of the actuation element is sensible. Additionally, in the example embodiment of an electromagnetically actuatable locking mechanism, the operating condition of the blocking device can also be indirectly sensed. This can take place, for example, by a two-position controller.

A two-position controller of this type is known from DE 10 2016 221 477 A1, which is part of a device for operating and for determining an operating condition of an electromagnetic actuator. The known device includes a determination means in addition to the two-position controller for operating the actuator. The determination means is designed for determining a time profile of an actuation signal output by the two-position controller and, on the basis thereof, determining the operating condition. In particular, a dynamic of the actuation signal is determined for this purpose. The known device is designed for supplying an electric current and/or actuator current to the actuator on the basis of the actuation signal. A characteristic time profile of the actuator current forms according to the time profile of the actuation signal. The operating condition of the actuator is inherently contained therein, because the operating condition essentially determines the speed at which the actuator current increases and then decreases, as well as the maximum level and the average level of the actuator current. Finally, the operating condition of the actuator is determinable under consideration of the actuation signal of the two-position controller.

The method according to example aspects of the invention for operating the device makes use of this knowledge, according to which current is supplied to the electromagnetic actuator in response to a demand for releasing the blocking device. As a result, the actuation element is displaced in the axial direction counter to the spring force of the spring device in such a way that the blocking elements are displaced radially inward along the truncated cone-shaped section of the piston and the positive engagement between the blocking elements and the piston is released. This allows for a displacement of the piston in the axial direction between its first position and its second position in order to engage or disengage the parking lock device.

Regardless of the design of the sensor, in one advantageous variant of the method according to example aspects of the invention, the axial position of the actuation element and, as a function thereof, the operating condition of the blocking device are determined.

This is easily possible, since the actuation element assumes a different axial position in the first position of the piston than in the second position of the piston.

If the electromagnetic actuator is designed, for example, as an electromagnetic linear actuator and has at least one or precisely one coil, by which an armature of the actuator is magnetically actuatable, the movement of the armature is tappable at the actuator and is mechanically usable as an actuating movement of the actuator. The movement of the armature can be directly determined, for example, by a position sensor, such as an above-described PNP sensor or Hall sensor. Alternatively, it is also possible to determine the axial position of the armature or of the actuation element indirectly on the basis of the actuator current, as is known from DE 10 2016 221 477 A1.

In one advantageous variant of the method according to example aspects of the invention, an engaged operating condition or a disengaged operating condition of the parking lock device is determined by a further sensor. The operating condition of the parking lock device is then determinable with great accuracy by a comparison of the operating conditions of the parking lock device and of the blocking device, each of which is determined by the sensor and the further sensor.

Moreover, in one further advantageous variant of the method according to example aspects of the invention, it is easily possible to detect a non-engaged operating condition or a non-disengaged operating condition of the parking lock device. A particular signal output by the sensor can be evaluated for this purpose. On the basis of a signal of this type, a check can be carried out to determine whether a deviation currently exists between a position of the actuation element assumed by the actuation element in the case of a demanded engaged condition of the parking lock device or in the case of a demanded disengaged condition of the parking lock device, and a current position of the actuation element.

If the determined deviation is greater than a threshold value, by means of which deviations due, for example, to manufacturing tolerances, are able to be taken into account, a faulty operating condition of the parking lock device can be determined.

Additionally, it can be provided that the operating condition of the parking lock device determined by the further sensor of the parking lock device is classified as faulty when a deviation greater than the threshold value is determined by the sensor that is associated with the actuation element.

In addition, it is provided in further advantageous variants of the method according to example aspects of the invention that a haptic signal, an optical signal, and/or an acoustic signal are/is output upon detection of a non-engaged operating condition or upon detection of a non-disengaged operating condition of the parking lock device or upon classification of an operating condition of the parking lock device as faulty. By a signal of this type or by signals of this type, an operator of a vehicle that has an automatic transmission designed with the device and with the parking lock device can be informed of the possibly faulty condition of the parking lock device.

Additionally or alternatively, it can also be provided that, upon detection of a limited functionality of the parking lock device, a substitute measure for actuating the parking lock device and/or a vehicle-specific escalation strategy and/or at least one diagnostic function are/is initiated.

For example, a substitute measure for actuating the parking lock device can be that a hydraulically actuatable parking lock device is acted upon by a higher pressure than usual, in order to be able to transfer the parking lock device into the currently demanded operating condition.

By a vehicle-specific escalation strategy, for example, a vehicle can be secured against undesirably rolling away by an automated actuation of an electronic service brake when it is detected that the parking lock device is not engageable as demanded.

In addition, by an escalation strategy of this type, a display can be shown to the driver indicating that a visit to the workshop is necessary. A very high escalation level could provide, for example, that a vehicle is brought to a standstill if an operational failure of the parking lock device is ascertained.

Example aspects of the invention also relates to a control unit, which is designed for carrying out the method according to example aspects of the invention. The control unit includes, for example, means utilized for carrying out the method according to example aspects of the invention. These means can be hardware-related means and software-related means. The hardware-related means of the control unit or of the control device are, for example, data interfaces for exchanging data with the assemblies of the device contributing to the carrying-out of the method according to example aspects of the invention. Further hardware-related means are, for example, a memory for data storage and a processor for data processing. Software-related means can be, among other things, program modules for carrying out the method according to example aspects of the invention.

In order to carry out the method according to example aspects of the invention, the control unit is implementable with at least one receive interface, which is designed for receiving signals from signal transmitters. The signal transmitters can be designed, for example, as sensors, which gather measured quantities and transmit the signals to the control unit. A signal transmitter can also be referred to as a signal sensor. The receive interface of a signal transmitter can receive a signal, by which the receive interface is signaled that the blocking device is to be released and that the axial position of the actuation element and, as a function thereof, the operating condition of the blocking device are to be determined. The signal can be generated, for example, by an operator, in that the operator actuates a control element, by which such an actuation of the device as well as such a determination of the axial position of the actuation element and of the operating condition of the blocking device can be demanded.

The control unit can also include a data processing unit, in order to evaluate and/or process the received input signals or the information of the received input signals.

The control unit can also be implemented with a transmit interface, which is designed for outputting control signals to actuation elements. An actuation element is to be understood to refer to actuators that implement the commands of the control unit. The actuators can be designed, for example, as electromagnetic valves.

If, during the operation of the device, it is detected by the control unit or determined on the basis of received input signals, that a demand for releasing the blocking device is present, the control unit then determines an appropriate demand on the basis of detected input signals and initiates an appropriate energization of the electromagnetic actuator. Due to the energization of the electromagnetic actuator, the actuation element is displaced in the axial direction counter to the spring force of the spring device. As a result, the blocking elements are displaced radially inward along the truncated cone areas of the piston. Additionally, as a result, the positive engagement between the blocking elements and the piston is released. When the positive engagement is released, the piston is displaceable in the axial direction between the first position and the second position in order to engage or disengage the parking lock device.

Moreover, the control unit is designed in such a way that an axial position of the actuation element determined by the sensor and, as a function thereof, the operating condition of the blocking device are determinable. The control unit detects a locked operating condition of the blocking device when the actuation element has a defined axial position. Additionally, the control unit detects whether the blocking device blocks the actuating movement of the piston in the first position of the piston or in the second position of the piston. This results from the fact that the actuation element assumes a different axial position in the first position of the piston than in the second position of the piston.

The aforementioned signals are to be considered merely as examples and are not intended to limit the invention. The gathered input signals and the output control signals can be transmitted via a signal transmission system of the vehicle, for example, via a CAN-BUS. The control device or the control unit can be designed, for example, as a central electronic control unit of a vehicle drive train or as an electronic transmission control unit.

The approach according to example aspects of the invention can also be embodied as a computer program product, which, when running on a processor of a control device, instructs the processor, via software, to carry out the assigned method steps, which are subjects of example aspects of the invention. In this context, a computer-readable medium, on which an above-described computer program product is retrievably stored, is also a subject of example aspects of the invention.

The invention is not limited to the described combination of the features of the other independent claims or of the claims dependent thereon. In addition, possibilities result for combining individual features with one another, also provided they arise from the claims, the following description of embodiments, or directly from the drawing. The reference in the claims to the drawings via the use of reference characters is not intended to limit the scope of protection of the claims.

BRIEF DESCRIPTION OF THE DRAWINGS

Exemplary embodiments of the invention are explained in greater detail with reference to the drawings, without being limited thereto, wherein:

FIG. 5 shows line graphs, each of which graphically represents the functional interaction between the piston and the blocking device according to the exemplary embodiments shown in FIG. 4.

DETAILED DESCRIPTION

Figure 1:
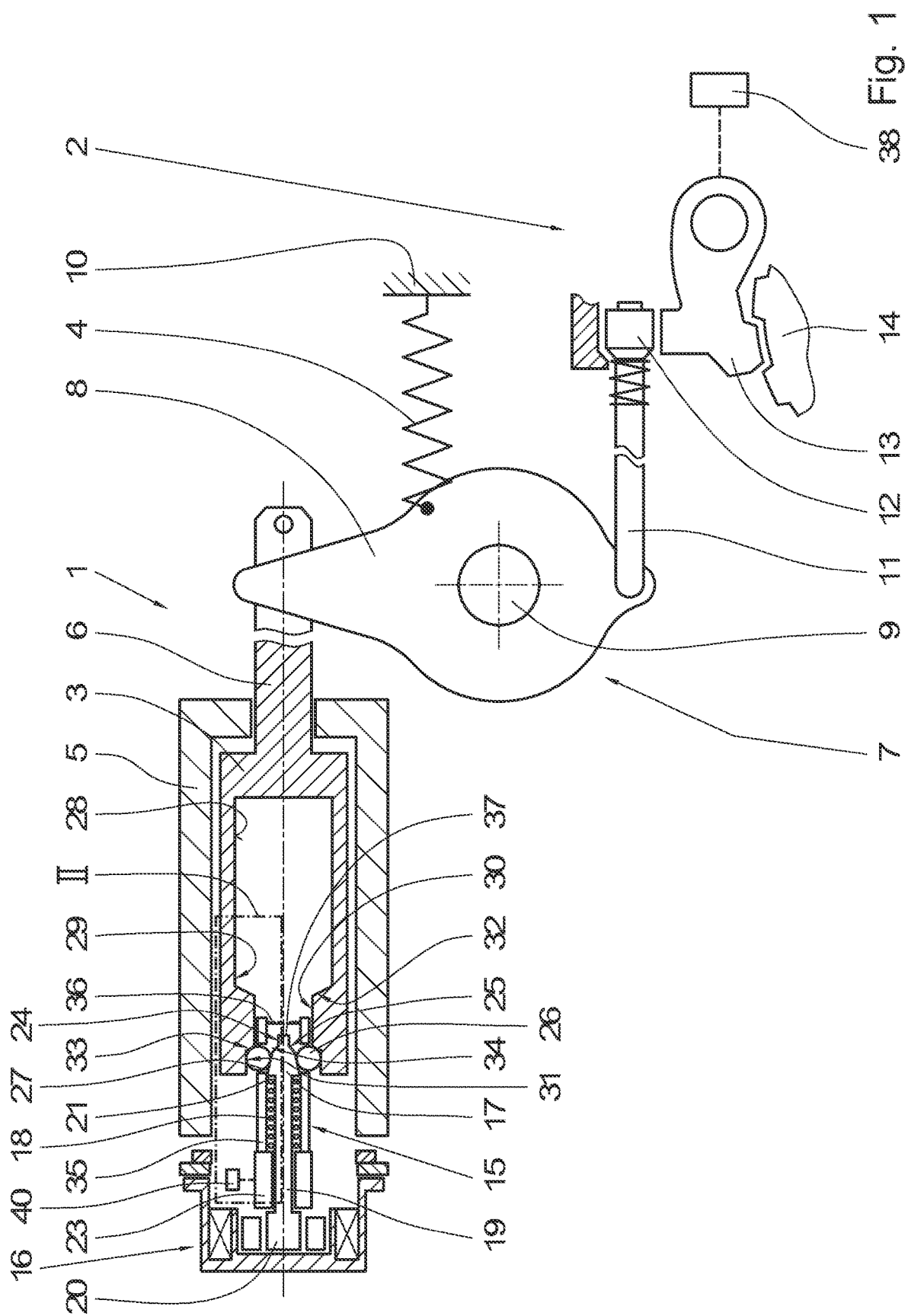
FIG. 1 shows a highly schematicized partial representation of a device for actuating a parking lock device of an automatic transmission.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

In FIG. 1, a schematic part longitudinal cutaway view of a device 1 for actuating a parking lock device 2 is represented. The device 1 includes a piston 3 capable of being acted upon by a fluid, such as hydraulic fluid. The piston 3 is actuatable, as a function of the particular applied fluid pressure, in the disengagement direction or in the direction of a disengaged operating condition of the parking lock device 2 counter to an actuation spring 4 acting here, by way of example, in the engagement direction of the parking lock device 2. For this purpose, the piston 3 is arranged, displaceably in the axial direction, in a cylinder 5. Additionally, the piston 3 is connected to a reversing mechanism 7 by a driving pin 6. In the present case, the reversing mechanism 7 includes a rotary disk 8, which is designed to be rotatable in the area of a pin 9. The actuation spring 4 is designed as a tension spring in the present case, by way of example, and is connected at one end to the rotary disk 8. At the other end, the actuation spring 4 is supported in the area of a housing 10.

Moreover, the rotary disk 8 is operatively connected to a parking interlock rod 11, which is coupled to a parking interlock cone 12. The parking interlock cone 12 interacts with a parking pawl 13. The parking pawl 13 is engageable, by an axial movement of the piston 3, with a parking interlock gear 14, which is rotationally fixed to a drive output of a vehicle drive train, in order to rotationally fix a drive output. If the parking pawl 13 is guided out of the engagement with the parking interlock gear 14 by an axial movement of the piston 3 in the opposite direction, the parking lock device 2 is disengaged and the drive output is rotatable.

In addition, the device 1 is designed with a blocking device 15, which includes radially displaceable blocking elements 26. The blocking elements 26 are radially displaceable by an actuation element 17. In the first position of the piston 3 represented in FIG. 1 and FIG. 2, the parking lock device 2 is engaged. Additionally, the blocking elements 26 distributed over the circumference of the rotationally symmetrically designed actuation element 17 are displaced radially outward by the actuation element 17 and fix the piston 3 in a form-locking manner. This means that the piston 3, starting from the first position shown in FIG. 1, is not displaceable in the axial direction X out of the first position by an appropriate application of a hydraulic pressure. In this operating condition of the device 1, the blocking device 15 is activated and is in the locked operating condition.

Additionally, the device 1 also includes an electromagnetic actuation device 16, which interacts with an armature rod 19 in the present case. The armature rod 19 and the actuation element 17 are jointly longitudinally movably arranged in the interior of the cylinder 5. The actuation element 17, the armature rod 19, and an armature element 20 operatively connected to the armature rod 19 are designed to be displaceable in the axial direction X with respect to the cylinder 5 and the piston 3. A spring device 18, which has been slid onto the armature rod 19, is provided between an end face 21 of the actuation element 17 and a housing-affixed component 23 of the actuation device 16. By the spring device 18, the actuation element 17 is acted upon by an actuating force acting in the direction of an axial position, in which the blocking elements 26 designed as balls in the present case are displaced radially outward and prevent or block an axial actuating movement of the piston 3.

The actuation element 17 is designed to be rotationally symmetrical. Additionally, the actuation element 17 has, consecutively in the axial extension direction X, one cylindrical section 24 and two sections 25 and 27 widening in the shape of a truncated cone starting from the cylindrical section 24. The blocking elements 26 rest against one of the sections 24, 25, or 27 as a function of the particular assumed axial position of the piston 3 and are displaceable in the radial direction, with respect to the actuation element 17, by moving the actuation element 17 in the axial extension direction X. The opening angle of the truncated cone-shaped section 25 adjacent to the cylindrical section 24 in the axial extension direction X of the actuation element 17 is larger than the opening angle of the further truncated cone-shaped section 27 adjacent to the truncated cone-shaped section 25.

The piston 3 has, in the area of a radial inner side 28 facing the actuation element 17, hollow-cylindrical sections 29, 30, and 31 extending in the axial direction X and situated adjacent to one another. The inner diameters of the hollow-cylindrical sections 29 through 31 deviate from one another. The inner diameter of the middle hollow-cylindrical section 30 is smaller than the inner diameters of the hollow-cylindrical sections 29 and 31 adjacent to the middle hollow-cylindrical section 30 on either side. The inner diameter of the hollow-cylindrical section 29 is larger than the inner diameter of the hollow-cylindrical section 31.

In the first position of the piston 3, the blocking elements 26 form-lockingly project into the first outer hollow-cylindrical section 31 and, in the second position of the piston 3, form-lockingly project into the second outer hollow-cylindrical section 29. Additionally, the blocking elements 26 then rest, in the axial direction X, against a truncated cone-shaped section 32, 33, in either case, of the piston 3, which are provided between the middle hollow-cylindrical section 30 and one of the outer hollow-cylindrical sections 29 and 31, respectively. The blocking elements 26 designed as balls are axially and radially guided in recesses 34 of a guide sleeve 35 operatively connected to the cylinder 5.

Figure 2:
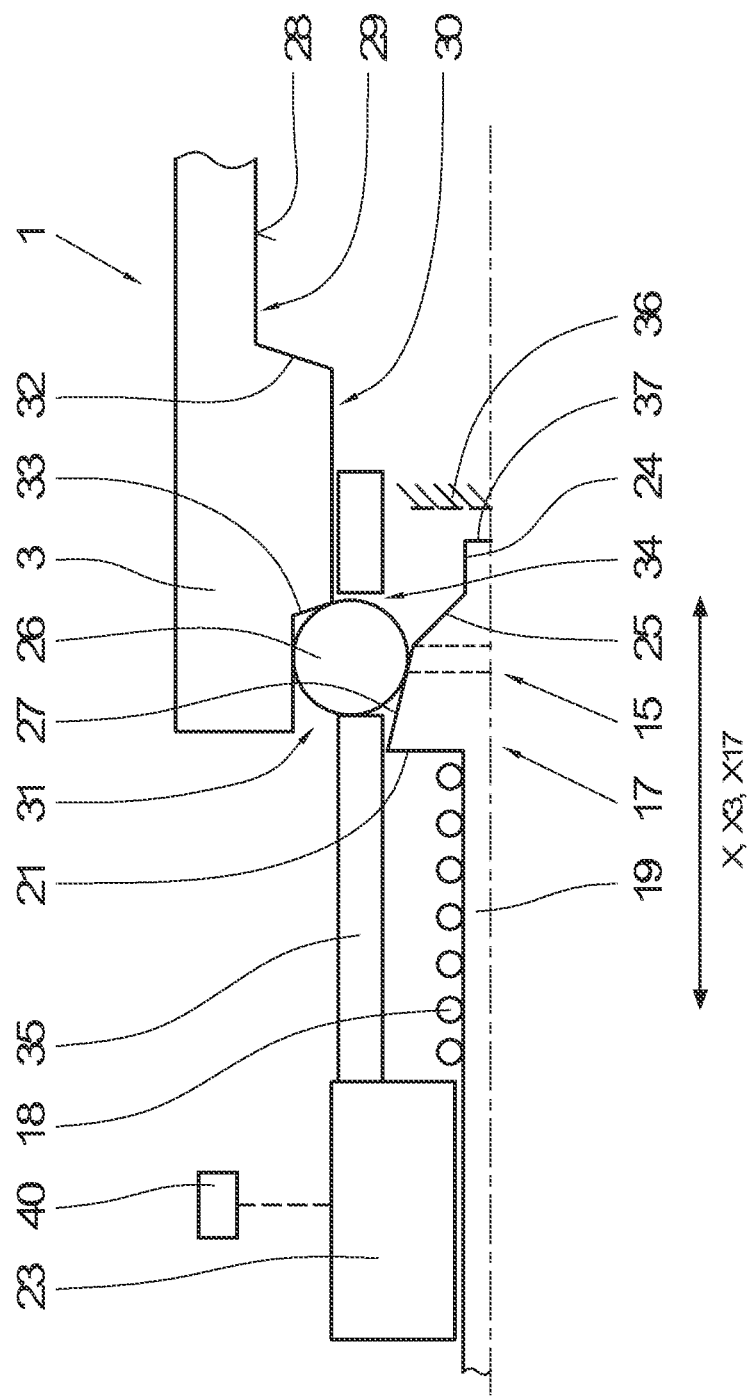
FIG. 2 shows an enlarged view of an area II characterized in greater detail in FIG. 1, which includes a blocking device of the device locked in a first position of a piston.

FIG. 2 shows an enlarged view of an area II characterized in greater detail in FIG. 1, which includes the blocking device 15, a portion of the piston 3, and the electromagnetic actuation device 16. Additionally, the blocking device 15 is shown in FIG. 2 in the blocking or locked operating condition, in which the blocking elements 26 project radially through the recesses 34 of the guide sleeve 35 into the hollow-cylindrical area 31 of the piston 3. Radially inward, the blocking elements 26 rest against the truncated cone-shaped section 27 of the actuation element 17.

Figure 3:
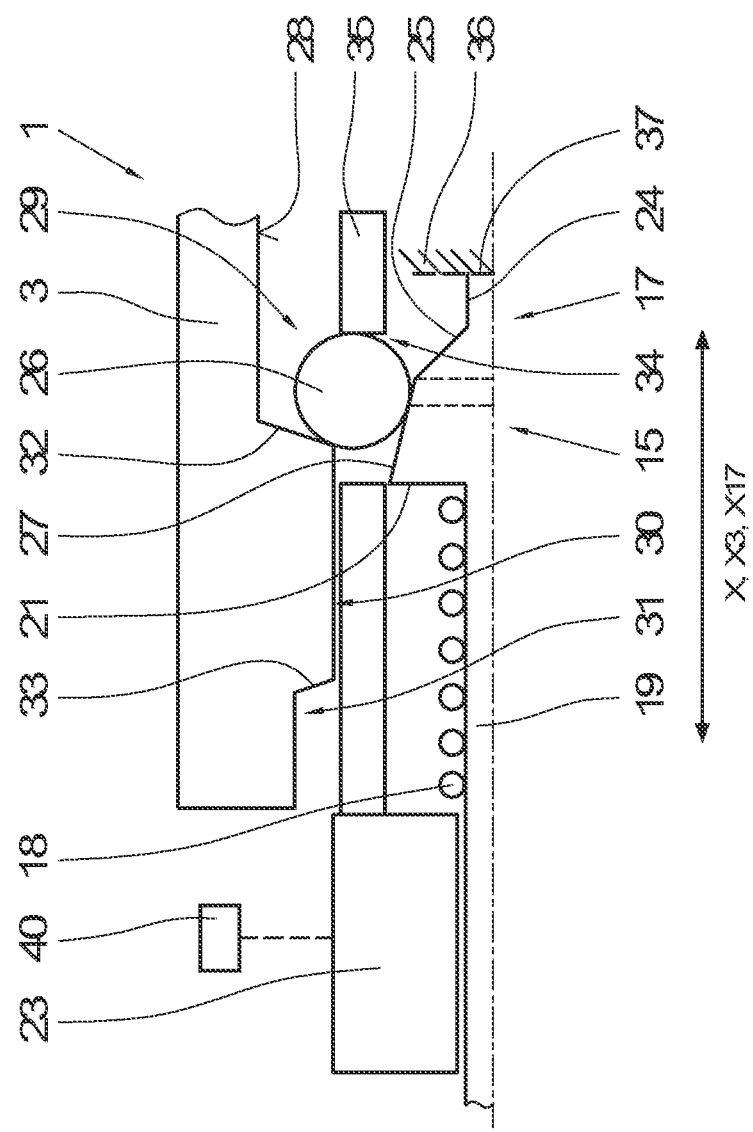
FIG. 3 shows a representation corresponding to FIG. 2, wherein the piston of the device according to FIG. 1 is in a second position and an axial actuating movement of the piston is blocked by the blocking device.

The opening angle of the truncated cone-shaped section 27 is designed in such a way that, despite an appropriate hydraulic actuation, the piston 3 is not axially displaceable out of the first position shown in FIG. 2 into the second position represented in FIG. 3, in which the parking lock device 2 is completely disengaged. This means that an actuating force starting from the truncated cone-shaped area 33 of the piston 3 and introduced into the blocking elements 26, resulting in a reaction force acting between the blocking elements 26 and the truncated cone-shaped section 27 of the actuation element 17, is not sufficiently great to axially displace the actuation element 17 counter to the spring force of the spring device 18.

Such an axial displacement of the actuation element 17 would result in the blocking elements 26 rolling at the outer side of the actuation element 17 during such an actuating movement of the actuation element 17. As the axial actuating movement of the actuation element 17 increases, the blocking elements 26 would be displaced radially inward until the blocking elements 26 rest against the truncated cone-shaped section 25 of the actuation element 17, the opening angle of which is larger than the opening angle of the truncated cone-shaped section 27. The actuating force introduced into the actuation element 17 by the piston 3 via the blocking elements 26 then exceeds the actuating force that is applied at the actuation element 17 while the blocking elements 26 rest against the truncated cone-shaped section 27. In such an operating condition of the blocking device 15, the actuation element 17 is displaced farther in the direction of the electromagnetic actuation device 16 until the blocking elements 26 completely release the actuating movement of the piston 3 starting from the first position shown in FIG. 2 in the direction of the second position shown in FIG. 3.

In order to be able to reliably hold the parking lock device 2 in the disengaged operating condition continuously without an appropriate hydraulic actuation, the blocking device 15 transitions into the locked operating condition due to the spring force of the spring device 18 in the second position of the piston 3.

Figure 4:
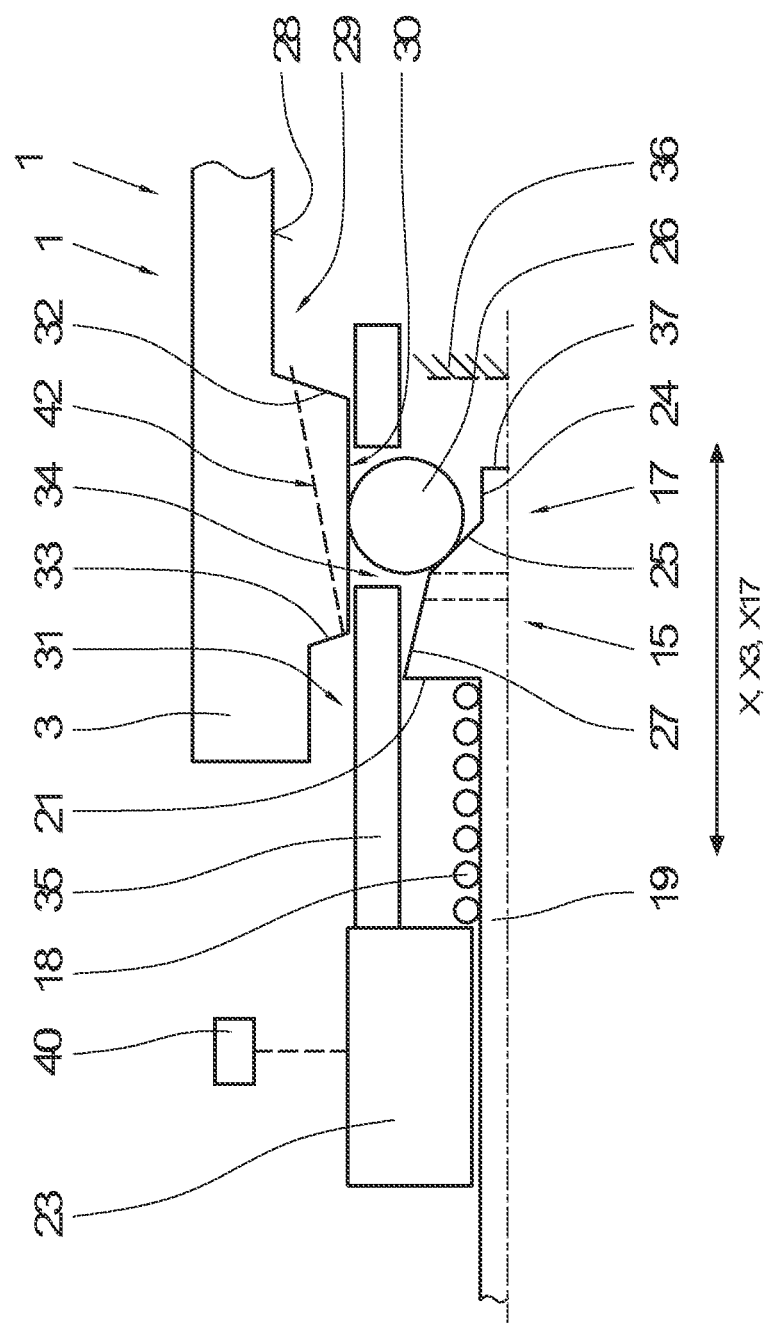
FIG. 4 shows a representation corresponding to FIG. 2, wherein the blocking device has a released operating condition.

FIG. 4 shows a representation of the area II corresponding to FIG. 2 and FIG. 3. The blocking device 15 is in the released operating condition, in which the piston 3 has an axial actuating position between the first position and the second position. In this operating condition of the device 1, the blocking elements 26 are radially arranged between the middle hollow-cylindrical section 30 of the piston 3 and the truncated cone-shaped section 25 of the actuation element 17 adjacent to the cylindrical section 24. In this position of the blocking elements 26, there is no positive engagement between the guide sleeve 35 and the piston 3, and so the piston 3 is freely axially displaceable with respect to the cylinder 5.

As soon as the piston 3 has reached the second position, the actuation element 17 is axially displaced by the spring device 18 in the direction of a mechanical stop 36 provided on the housing side. In the process, the blocking elements 26, which are then displaced radially outward through the recesses 34, roll at the truncated cone-shaped section 25 and at the further truncated cone-shaped section 27, until the blocking elements 26 project into the hollow-cylindrical section 29 of the piston 3. In this operating condition of the device 1, the blocking elements 26 block an actuating movement of the piston 3 in the direction of the rotary disk 8 and, thereby, prevent an unintentional engagement of the parking lock device 2.

The opening angle of the truncated cone-shaped section 27 of the actuation element 17 is designed in such a way that the particular actuating force applied by the piston 3 at the blocking elements 26 in the locked condition of the blocking device 15 is not sufficient for axially displacing the actuation element 17 in the direction of the electromagnetic actuation device 16 and releasing the block of the blocking device 15.

In order to be able to release the blocking device 15 as demanded, the actuation element 17 or the armature element 20 and the armature rod 19 are axially displaceable away from the stop 36 counter to the spring force of the spring device 18 when the electromagnetic actuation device 16 is appropriately energized. During such an actuating movement of the actuation element 17, the blocking elements 26 fall radially inward and the positive engagement between the piston 3 and the cylinder 5 and/or the guide sleeve 35 operatively connected thereto is released. If the piston 3 is then in the second position represented in FIG. 3, the piston 3 is displaced by the spring device 4 in the direction of its first position and, thereby, the parking lock device 2 is engaged as demanded.

In order to ensure that the blocking device 15 transitions into the locked operating condition once the first position of the piston 3 has been reached, the current supply to the electromagnetic actuation device 16 is switched off when the piston 3 is in a position between the first position and the second position. As a result, once the first position of the piston 3 has been reached, the actuation element 17 is displaced by the spring device 18 in the direction of the mechanical stop 36 and the blocking elements 26 are displaced radially outward. When the blocking elements 26 engage into the hollow-cylindrical section 31 of the piston 3 in a form-locking manner, the blocking elements 26 prevent an axial actuating movement of the piston 3 in the direction of the second position.

As described above, the inner diameter of the hollow-cylindrical section 31 is smaller than the inner diameter of the hollow-cylindrical section 29 of the piston 3. Additionally, the truncated cone-shaped sections 25 and 27 of the actuation element 17 are adapted to the inner diameters of the hollow-cylindrical sections 29 through 31, respectively, of the piston 3 in such a way that, in the first position of the piston 3, the blocking device 15 completely locks, although a further end face 37 of the actuation element 17 is axially spaced apart from the mechanical stop 36.

In contrast thereto, the actuation element 17 in the presently described embodiment of the device 1 rests completely against the mechanical stop 36 in the second position of the piston 3 in the locked operating condition of the blocking device 15. This means that the actuation element 17 assumes a different axial position in the first position of the piston 3 than in the second position of the piston 3.

Therefore, it is possible to determine which locking condition the blocking device 15 is in by a sensor 40 associated with the electromagnetic actuation device 16, which can be designed, for example, as a Hall sensor. This possibility offers a simple implementation of various functions, such as an adaptation of the sensor 40 in the disengaged operating condition of the parking lock device 2. A sensor 38, which is, for example, a Hall sensor or a PNP sensor, is also associated with the parking lock device 2. The engaged operating condition as well as the disengaged operating condition of the parking lock device 2 are easily determinable by the sensor 38.

The design of the device 1 having the two sensors 38 and 40 is characterized by a redundancy, which ensures a greater availability of the parking lock device 2.

Additionally or alternatively, it is also possible that a sensor 40 is associated with the electromagnetic actuation device 16, the mode of operation of which is known from DE 10 2016 221 477 A1. This sensor 40 includes a two-position controller for operating an actuator, and a determination means. The determination means is designed for determining a time profile of the actuation signal output by the two-position controller and, on the basis thereof, determining the operating condition. The actuator corresponds to the electromagnetic actuation device 16 and the actuation signal corresponds to the actuation current of the electromagnetic actuation device 16. This means that the present axial position of the actuation element 17 is determinable by a sensor of this type as a function of the particular output actuation current as well as of the coil current arising in the area of a coil.

A mutual plausibility check of the sensor signals is possible by a comparison of the sensor signals of the sensor 40 and of the sensor 38, as the result of which safety is improved.

By the above-described device 1, the accuracy of the sensor provided for determining the axial position of the actuation element and, thereby, also the operating condition of the blocking device, is easily improvable by an appropriate adaptation during the vehicle operation. An adaptation of this type is implementable, in principle, in both locking positions of the actuation element 17.

In principle, the locking of the piston 3 in the second position is more robust than in the first position of the piston 3, since the actuation element 17 must pass through a longer stroke in order to release the lock of the blocking device 15. In addition to the two locked operating conditions of the blocking device 15, a transition condition of the blocking device 15 between a locked operating condition and a released operating condition as well as a completely released operating condition of the blocking device 15 are also easily determinable.

As a function of the particular current application, it is also possible that the blocking device 15 is transferred into the locked operating condition in the energized operating condition of the electromagnetic actuation device 16. The spring device 18 is then mounted at the actuation element 17, acting in the opposite direction. In the non-energized operating condition of the electromagnetic actuation device 16, the spring force of the spring device 18 axially displaces the actuation element 17 in such a way that the blocking device is deactivated.

Moreover, it is also possible not to provide the spherical blocking elements, but rather blocking elements that are pivotably in an operative connection with the cylinder 5 and are designed having a preferably hook-like end. These blocking elements are then pivotable radially outward by the actuation element, in order to prevent an actuating movement of the piston or to release an actuating movement of this type.

The piston 3 can have a truncated cone-shaped section 42, instead of the hollow-cylindrical section 30, between the hollow-cylindrical sections 29 and 31 in the manner shown in FIG. 4. The inner diameter of the tapered section 42 constantly increases, according to the dashed line, in the axial direction of the piston 3 starting from the hollow-cylindrical section 31 in the direction of the hollow-cylindrical section 29. Therefore, a linear relationship exists between the axial position of the piston 3 and the axial position of the actuation element 17.

In FIG. 5, two line graphs L30 and L42 are represented, each of which shows the functional relationship between the axial position of the piston 3 and the actuation element 17. The line graph L30, which is represented as a solid line, corresponds to the functional relationship between the axial position x17 of the actuation element 17 and the axial position x3 of the embodiment of the piston 3 that is designed having a hollow-cylindrical section 30. In contrast thereto, the line graph L42, which is shown as a dashed line, graphically represents the functional relationship between the axial position x17 of the actuation element 17 and the axial position x3 of the embodiment of the piston 3 that has the truncated cone-shaped section 42.

In the first actuation-travel range x3I of the piston 3, the parking lock device 2 is engaged and an actuating movement of the piston 3 that disengages the parking lock device 2 is prevented by the activated blocking device 15. In the actuation-travel range x3II adjacent to the first actuation range x3I and extending between the actuation-travel values x3A and x3B, the blocking device 15 is deactivated, the piston 3 is displaceable, and the parking lock device 2 is engageable or disengageable. The second actuation-travel range x3II is adjoined by a third actuation-travel range x3III, in which the parking lock device 2 is disengaged and an actuating movement of the piston 3, which engages the parking lock device 2, is prevented by the activated blocking device 15.

The two example embodiments of the piston 3, which are shown in FIG. 4, are designed differently only between the truncated cone-shaped sections 32 and 33. Therefore, the two line graphs L30 and L42 deviate from each other only in the second axial actuation-travel range x3II of the piston 3 between the discrete values x3A and x3B of the axial position of the piston 3. This is the case, since the inner diameter of the piston 3 and, thereby, the profile of the line graph 42 constantly changes in the second actuation-travel range x3II between the values x3A and x3B. Therefore, in addition to the released condition of the blocking device 15, the direction of the actuating movement of the piston 3 during an engagement process or during a disengagement process of the parking lock device 2 is also determinable by means of the sensor 40.

In addition, it is also possible to determine the current operating condition of the parking lock device 2 as well as the mode of operation of the parking lock device 2 as specified without the sensor 38 on the basis of the functional relationship according to the line graph L42. As a result, an automatic transmission is more cost-effectively manufacturable.

During the operation of the parking lock device 2, the sensor 38 delivers a signal indicating whether the parking lock device 2 is engaged or disengaged. If an operating condition of the blocking device 15 or an axial position x17 of the actuation element 17 and, thereby, also an axial position x3 of the piston 3 is/are determined by the sensor 40, which does not coincide with the engaged or disengaged condition of the parking lock device 2 currently determined by the sensor 38, the information on the part of the sensor 38 is preferably at least temporarily discarded as faulty.

Additionally, substitute reactions, diagnostic functions, warning signals, or escalation strategies can then be initiated as a function of the particular current application.

It can be provided, for example, that, as a function of the signal of the sensor and the information regarding the operating condition of the parking lock device 2 that is therefore available, a position display in the dashboard is activated and/or the PNP sensor signal of the sensor 38 is validated. Moreover, the signal can be utilized as a substitute function in the case of a failure of the PNP sensor 38. Additionally, the parking brake of a vehicle can be actuated as a function of the information of the signal of the sensor 40 in the case of an excessively long period of time between the receipt of the signal of the sensor 38 and the expected signal indicating that the piston 3 has been locked by the blocking device 15.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS 1 device
2 parking lock device
3 piston
4 actuation spring
5 cylinder
6 driving pin
7 reversing mechanism
8 rotary disk
9 pin
10 housing
11 parking interlock rod
12 parking interlock cone
13 parking pawl
14 parking interlock gear 15 blocking device
16 electromagnetic actuation device
17 actuation element
18 spring device
19 armature rod
20 armature element
21 end face
23 housing-affixed component
24 cylindrical section of the actuation element
25 truncated cone-shaped section of the actuation element
26 blocking element
27 truncated cone-shaped section of the actuation element
28 radial inner side of the piston
29 to 31 hollow-cylindrical section of the piston
32, 33 truncated cone-shaped section of the piston
34 recess of the guide sleeve
35 guide sleeve
36 mechanical stop
37 further end face of the actuation element
38 sensor
40 sensor
42 truncated cone-shaped section of the piston
L30 line graph
L42 line graph
X axial direction
X3 axial position of the piston
X3A, X3B discrete value of the axial position of the piston
X3I, X3II, X3III actuation-travel range
X17 axial position of the actuation element

The invention claimed is:

1. A device (1) for actuating a parking lock device (2) of an automatic transmission, comprising:
a piston (3) guided in a cylinder (5) and hydraulically displaceable counter to a spring force of an actuation spring (4);
a blocking device (15) comprising radially displaceable blocking elements (26), the piston (3) bringable into an operative connection with a parking pawl (13), the piston (3) form-lockingly fixable by the radially displaceable blocking elements (26) of the blocking device (15) both in a first position corresponding to an engaged operating condition of the parking lock device (2) and in a second position corresponding to a disengaged operating condition of the parking lock device (2); and
an actuation element (17), the blocking elements (26) radially displaceable by the actuation element (17),
wherein a radial displacement path of the blocking elements (26) in the first position of the piston (3) and a corresponding operating condition of the actuation element (17) deviate from the radial displacement path of the blocking elements (26) in the second position of the piston (3) and the corresponding operating condition of the actuation element (17),
wherein the blocking elements (26) are configured as balls that are axially and radially guided in recesses (34) of a guide sleeve (35) operatively connected to the cylinder (5).

2. The device of claim 1, wherein:
the actuation element (17) is configured as at least approximately rotationally symmetrical and comprises, consecutively in an axial extension direction (X) of the actuation element (17), a plurality of sections (24, 25, 27) with one cylindrical section (24) and two sections (25, 27) widening in the shape of a truncated cone starting from the cylindrical section (24);
the blocking elements (26) rest against the sections (24, 25, 27) of the actuation element (17) respectively and are displaceable in a radial direction relative to the actuation element (17) by moving the actuation element in the axial extension direction (X); and
an opening angle of a first truncated cone-shaped section (25) of the two sections (25, 27) adjacent to the cylindrical section (24) in the axial extension direction (X) of the actuation element (17) is larger than the opening angle of a second truncated cone-shaped section (27) of the two sections (25, 27) adjacent to the truncated cone-shaped section (25).

3. The device of claim 2, wherein:
the piston (3) comprises a plurality of hollow-cylindrical sections (29 through 31) proximate a radial inner side (28) of the piston (3) facing the actuation element (17), the hollow-cylindrical sections (29 through 31) extending in an axial direction and situated adjacent to one another;
an inner diameters of the hollow-cylindrical sections (29 through 31) deviate from one another, the inner diameter of a middle hollow-cylindrical section (30) of the hollow-cylindrical sections (29 through 31) is smaller than the inner diameters of the outer hollow-cylindrical sections (29, 31) of the hollow-cylindrical sections (29 through 31) adjacent to the middle hollow-cylindrical section (30) on either side; and
the blocking elements (26) form-lockingly project into a first one of the outer hollow-cylindrical sections (29, 31) in the first position of the piston (3) and form-lockingly project into a second one of the outer hollow-cylindrical sections (29, 31) in the second position of the piston (3).

4. The device of claim 3, wherein the blocking elements (26) rest, in the axial direction, against a respective truncated cone-shaped section (32, 33) of the piston (3), which are provided between the middle hollow-cylindrical section (30) and one of the outer hollow-cylindrical sections (29 or 31) on either side, when the blocking elements (26) project into the hollow-cylindrical sections (29 or 31) of the piston (3).

5. A method for operating the device (1) of claim 4, wherein a spring device (18) is provided between the cylinder (5) and the actuation element (17), a spring force of the spring device (18) acting at the actuation element (17) in a direction of a position of the actuation element (17), in which the blocking elements (26) rest against the second truncated cone-shaped section (27) of the actuation element (17), and wherein the actuation element (17) is actuatable counter to the spring device (18) by an electromagnetic actuation device (16), the method comprising:
in response to a demand for releasing the blocking device (15), supplying current to the electromagnetic actuation device (16) and displacing the actuation element (17) in the axial direction counter to the spring force of the spring device (18) in order to displace the blocking elements (26) radially inward along the truncated cone-shaped sections (32, 33) of the piston (3) and release the positive engagement between the blocking elements (26) and the piston (3); and
displacing the piston (3) in the axial direction (X) between the first position and the second position in order to engage or disengage the parking lock device (2).

6. The method of claim 5, wherein a sensor (40) is provided for determining an axial actuation travel of the actuation element (17), the method further comprising:
determining the axial position of the actuation element (17) with the sensor (40); and determining the operating condition of the blocking device (15) as a function of the determined axial position of the actuation element (17).

7. The method of claim 6, further comprising determining an engaged operating condition or a disengaged operating condition of the parking lock device (2) with a further sensor (38).

8. The method of claim 7, further comprising, in the presence of a deviation greater than a threshold value by the sensor (40) between a demanded position of the actuation element (17) and a current position of the actuation element (17), detecting a non-engaged operating condition or a non-disengaged operating condition of the parking lock device (2).

9. The method of claim 8, classifying the determined operating condition from the further sensor (38) as faulty when a deviation greater than the threshold value is determined by the sensor (40) that is associated with the actuation element (17).

10. The method of claim 9, further comprising, upon detection of a non-engaged operating condition or a non-disengaged operating condition of the parking lock device (2) or upon classification of an operating condition of the parking lock device (2) as faulty:
outputting one or more of a haptic signal, an optical signal, and an acoustic signal for an operator of a vehicle that includes an automatic transmission that includes the device (1) and the parking lock device (2); and/or
initiating one or both of a substitute measure for actuating the parking lock device (2) and a vehicle-specific escalation strategy.

11. The device of claim 3, wherein, when the piston (3) is in a position between the first position and the second position, the blocking elements (26) are situated radially between the middle hollow-cylindrical section (30) of the piston (3) and the first truncated cone-shaped section (25) of the actuation element (17) adjacent to the cylindrical section (24).

12. The device of claim 1, wherein:
the piston (3) comprises hollow-cylindrical sections (29, 31) proximate a radial inner side (28) of the piston (3) facing the actuation element (17), the hollow-cylindrical sections (29, 31) extending in an axial direction;
inner diameters of the hollow-cylindrical sections (29, 31) deviate from one another;
a middle truncated cone-shaped section (42) is provided between the hollow-cylindrical sections;
an inner diameter of the middle truncated cone-shaped section (42) is smaller than the inner diameters of the hollow-cylindrical sections (29, 31) adjacent to the middle truncated cone-shaped section (42) on either side; and
the blocking elements (26) form-lockingly project into a first one (31) of the hollow-cylindrical sections (29, 31) in the first position of the piston (3) and form-lockingly project into a second one (29) of the hollow-cylindrical sections (29, 31) in the second position of the piston (3).

13. The device of claim 12, wherein the blocking elements (26) rest, in the axial direction, against a respective truncated cone-shaped section (32, 33) of the piston (3), each of which are provided between the middle truncated cone-shaped section (42) and a respective one of the outer hollow-cylindrical sections (29 or 31), when the blocking elements (26) project into the hollow-cylindrical sections (29 or 31) of the piston (3).

14. The device of claim 13, wherein a diameter of the middle truncated cone-shaped section (42) constantly increases or constantly decreases between the truncated cone-shaped sections (32, 33) in the axial direction of the piston (3).

15. The device of claim 12, wherein, when the piston (3) is in a position between the first position and the second position, the blocking elements (26) are situated radially between the middle truncated cone-shaped section (42) of the piston (3) and a truncated cone-shaped section (25) of the actuation element (17) adjacent to a cylindrical section (24).

16. The device of claim 15, wherein the blocking elements (26) rest against a further truncated cone-shaped section (27) of the actuation element (17) in the first position and in the second position of the piston (3).

17. The device of claim 16, further comprising a spring device (18) provided between the cylinder (5) and the actuation element (17), a spring force of the spring device (18) acting at the actuation element (17) in a direction of a position of the actuation element (17), in which the blocking elements (26) rest against the further truncated cone-shaped section (27) of the actuation element (17).

18. The device of claim 17, wherein the actuation element (17) is actuatable counter to the spring device (18) by an electromagnetic actuation device (16).

19. The device of claim 17, wherein a spring device-side axial actuation travel of the actuation element (17) is limited by a mechanical stop (36).

20. The device of claim 1, further comprising a sensor (40) configured for determining an axial actuation travel of the actuation element (17).

* * * * *